US 11,463,658 B2

(12) United States Patent
Watahiki et al.

(10) Patent No.: US 11,463,658 B2
(45) Date of Patent: Oct. 4, 2022

(54) CAMERA SYSTEM

(71) Applicant: CIAO INC., Tokyo (JP)

(72) Inventors: Ryuichi Watahiki, Tokyo (JP);
Tomoaki Nitta, Tokyo (JP)

(73) Assignee: CIAO INC., Tokyo (JP)

( * ) Notice: Subject to any disclaimer, the term of this patent is extended or adjusted under 35 U.S.C. 154(b) by 0 days.

(21) Appl. No.: 16/950,478

(22) Filed: Nov. 17, 2020

(65) Prior Publication Data

US 2021/0067740 A1 Mar. 4, 2021

Related U.S. Application Data

(63) Continuation of application No. PCT/JP2019/019524, filed on May 16, 2019.

(30) Foreign Application Priority Data

May 22, 2018 (JP) .............................. JP2018-097991

(51) Int. Cl.
*H04N 5/77* (2006.01)
*G06F 3/0482* (2013.01)
(Continued)

(52) U.S. Cl.
CPC .............. *H04N 7/181* (2013.01); *G01W 1/00* (2013.01); *G09B 29/007* (2013.01);
(Continued)

(58) Field of Classification Search
CPC ........... H04N 7/181; H04N 5/77; G01W 1/00; G09B 29/007; G09B 29/106; G06F 3/0482
See application file for complete search history.

(56) References Cited

U.S. PATENT DOCUMENTS

| 7,275,089 B1 | 9/2007 | Marshall et al. |
| 9,411,072 B1 | 8/2016 | Dixon |

(Continued)

FOREIGN PATENT DOCUMENTS

| JP | 2004-349749 A | 12/2004 |
| JP | 2013-61252 A | 4/2013 |
| JP | 6049024 B2 | 12/2016 |

OTHER PUBLICATIONS

International Search Report issued in PCT/JP2019/019524 dated Jun. 25, 2019 with English Translation (3 pages).
(Continued)

*Primary Examiner* — Thai Q Tran
*Assistant Examiner* — Jose M Mesa
(74) *Attorney, Agent, or Firm* — Nakanishi IP Associates, LLC

(57) ABSTRACT

Provided is a camera system that includes: a weather information-acquiring unit acquiring weather information provided with respect to weather, the weather information including information relating to an area of interest; a plurality of cameras installed within a plurality of bases, respectively; a camera installation information-storing unit storing information with respect to positions of the bases wherein the plurality of cameras are installed; an image data-storing unit storing images photographed by the plurality of cameras respectively as moving images; a camera-specifying unit using the weather information acquired by the weather information-acquiring unit to specify a camera installed within the area of interest based on the information with respect to the positions of the bases, the information with respect to the positions of the bases being stored in the camera installation information-storing unit; and a moving image-providing unit acquiring from the image data-storing
(Continued)

unit moving images of the camera specified by the camera-specifying unit to provide the acquired moving images.

3 Claims, 12 Drawing Sheets

(51) Int. Cl.
  *G01W 1/00* (2006.01)
  *H04N 7/18* (2006.01)
  *G09B 29/00* (2006.01)
  *G09B 29/10* (2006.01)
(52) U.S. Cl.
  CPC ............ *G09B 29/106* (2013.01); *H04N 5/77* (2013.01); *G06F 3/0482* (2013.01)

(56) References Cited

U.S. PATENT DOCUMENTS

| | | |
|---|---|---|
| 2007/0288650 A1 | 12/2007 | Marshall et al. |
| 2010/0082776 A1 | 4/2010 | Marshall et al. |
| 2015/0212236 A1* | 7/2015 | Haas ..................... G06T 7/337 |
| | | 382/100 |
| 2017/0155915 A1 | 6/2017 | Nitta |
| 2017/0185278 A1* | 6/2017 | Sundermeyer ........ G06F 3/0486 |

OTHER PUBLICATIONS

International Preliminary Report on Patentability issued in PCT/JP2019/019524 dated Nov. 24, 2020 with English Translation (13 pages).
Extended European Search Report issued in European Patent Application No. 19806467.7, dated Mar. 25, 2021 (9 pages).
Communication pursuant to Article 94(3) issued in European Patent Application No. 19806467.7, dated Jan. 4, 2022 (6 pages).
Office Action issued in Chinese Patent Application No. 201980031627.4 dated Jul. 5, 2022, with English Translation (12 pages).

* cited by examiner

FIG. 11 date/time — 52
— 53
warning information — 54
heavy rain — 55
reflect weather information
60
61

CAMERA SYSTEM

FIELD OF THE INVENTION

The present invention relates to a camera system that displays images photographed by a plurality of cameras installed within a number of bases, more particularly, to a camera system that can display the camera images in accordance with weather information.

Description of the Related Art

The applicant has already developed an image-transmitting apparatus capable of suppressing a data transmission amount while avoiding blur and/or an after-image upon transmitting continuous frame images to compose moving images (See, Reference 1: Japanese Registered Patent No. 6049024).

This image-transmitting apparatus enables to obtain moving images with high quality in the small data transmission amount, and to install a lot of cameras within a plurality of bases at low cost. Further advances are expected toward spreading of cameras for the purpose of crime prevention, monitoring, and so on.

Reference 1: Japanese Registered Patent No. 6049024

OBJECTS AND SUMMARY OF THE INVENTION

Whereas, when a lot of cameras have been installed within a plurality of bases, management of the plurality of cameras may become difficult.

That is, as increase in the installation of many cameras to various places throughout the country, it becomes difficult to specify a specific camera among a lot of cameras scattered in the whole country, and to confirm images of the specified camera. This is a serious problem.

For this reason, even if a lot of cameras have been installed throughout the country, it must be said that there may be considerable possibility that the camera resources are not utilized well.

In view of the above, an object of the present invention is to provide a camera system capable of:

easily specifying, in accordance with weather information, a camera among a lot of cameras respectively installed within a plurality of bases; and confirming images of the specified camera.

A first aspect of the present invention provides a camera system, comprising: a weather information-acquiring unit acquiring weather information provided with respect to weather, the weather information including information relating to an area of interest; a plurality of cameras installed within a plurality of bases, respectively; a camera installation information-storing unit storing information with respect to positions of the bases wherein the plurality of cameras are installed; an image data-storing unit storing images photographed by the plurality of cameras respectively as moving images; a camera-specifying unit using the weather information acquired by the weather information-acquiring unit to specify a camera installed within the area of interest based on the information with respect to the positions of the bases, the information with respect to the positions of the bases being stored in the camera installation information-storing unit; and a moving image-providing unit acquiring from the image data-storing unit moving images of the camera specified by the camera-specifying unit to provide the acquired moving images.

According to the camera system of the present invention, the weather information including information with respect to the area of interest is acquired, a camera set within the area of interest is specified based on this acquired weather information, and moving images of the specified camera are provided.

And, it is preferable that the camera system further comprises a camera base position information-providing unit providing an image in which the bases wherein the plurality of cameras are installed are displayed on a map.

This arrangement enables, in addition to providing the moving images of the camera installed within the area of interest in accordance with the weather information as mentioned above, to provide the image in which the bases wherein the plurality of cameras are installed are displayed on the map.

And, it is also preferable that the camera system further comprises a weather information-providing unit providing an image wherein, based on the weather information acquired by the weather information-acquiring unit, the weather information is superposably displayed on the area of interest on a map.

This arrangement enables, in addition to providing the moving images of the camera installed within the area of interest in accordance with the weather information as mentioned above, to provide the image in which the weather information is superposably displayed on the area of interest on the map.

And, it is also preferable that the image data-storing unit further stores the images photographed by the plurality of cameras respectively also as thumbnail images, wherein the camera system further comprises a thumbnail image-providing unit acquiring from the image data-storing unit a thumbnail image relating to the camera specified by the camera-specifying unit to provide an image wherein the acquired thumbnail image is displayed as a list; and wherein the moving image-providing unit acquires moving images corresponding to a camera selected from a plurality of cameras whose thumbnail image is displayed as the list to provide the acquired moving images.

Due to this arrangement, the list of thumbnail images corresponding to a plurality of cameras installed within the area of interest specified based on the weather information is displayed. Accordingly, upon selecting a specific camera among the displayed cameras, moving images corresponding to the selected specific camera are provided.

Effect of Invention (1) A first aspect of the present invention provides a camera system, comprising: a weather information-acquiring unit acquiring weather information provided with respect to weather, the weather information including information relating to an area of interest; a plurality of cameras installed within a plurality of bases, respectively; a camera installation information-storing unit storing information with respect to positions of the bases wherein the plurality of cameras are installed; an image data-storing unit storing images photographed by the plurality of cameras respectively as moving images; a camera-specifying unit using the weather information acquired by the weather information-acquiring unit to specify a camera installed within the area of interest based on the information with respect to the positions of the bases, the information with respect to the positions of the bases being stored in the camera installation information-storing unit; and a moving image-providing unit acquiring from the image data-storing unit moving images of the camera specified by the camera-specifying unit to provide the acquired moving images.

According to this arrangement, moving images of a camera installed within the area of interest are provided in accordance with the weather information.

In this way, it becomes possible to: easily specify in accordance with the weather information a camera within the area of interest among a lot of cameras respectively installed within a plurality of bases; and to confirm moving images of the specified camera.

(2) A second aspect of the present invention provides, in addition to the first aspect, the camera system wherein the camera system further comprises a camera base position information-providing unit providing an image in which the bases wherein the plurality of cameras are installed are displayed on a map.

Due to the second aspect of the present invention, it becomes to possible to easily confirm on the map the respective base referring to provided, in accordance with the weather information as mentioned above, moving images of the camera installed within the respective base.

(3) A third aspect of the present invention provides, in addition to the first aspect, the camera system wherein further comprises a weather information-providing unit providing an image wherein, based on the weather information acquired by the weather information-acquiring unit.

Due to the third aspect of the present invention, the weather information is superposably displayed on the area of interest on a map, Not only the moving images of the camera installed within the area of interest in accordance with the weather information are provided, but also the weather information of the area of interest can be easily confirmed on the map.

(4) A fourth aspect of the present invention provides, in addition to the first aspect, the camera system wherein the image data-storing unit stores the images photographed by the plurality of cameras respectively also as thumbnail images, wherein the camera system further comprises a thumbnail image-providing unit acquiring from the image data-storing unit the thumbnail images relating to the camera specified by the camera-specifying unit to provide an image wherein the acquired thumbnail images are displayed as a list, and wherein the moving image-providing unit acquires moving images corresponding to a camera selected from plurality of cameras whose thumbnail images are displayed as the list to provide the acquired moving images.

Due to the fourth aspect of the present invention, upon selecting a camera based on a thumbnail image corresponding to the camera installed within the area of interest, the moving images corresponding to the selected camera are provided.

In this way, it becomes possible to easily specify in accordance with the weather information a camera among cameras installed within the area of interest and to confirm moving images of the selected camera.

BRIEF DESCRIPTION OF THE DRAWINGS

FIG. 11 shows an example of a column for selection of a division regarding warning or the like and an other column for more-detailed selection.

BRIEF DESCRIPTION OF SYMBOLS

Figure 1:
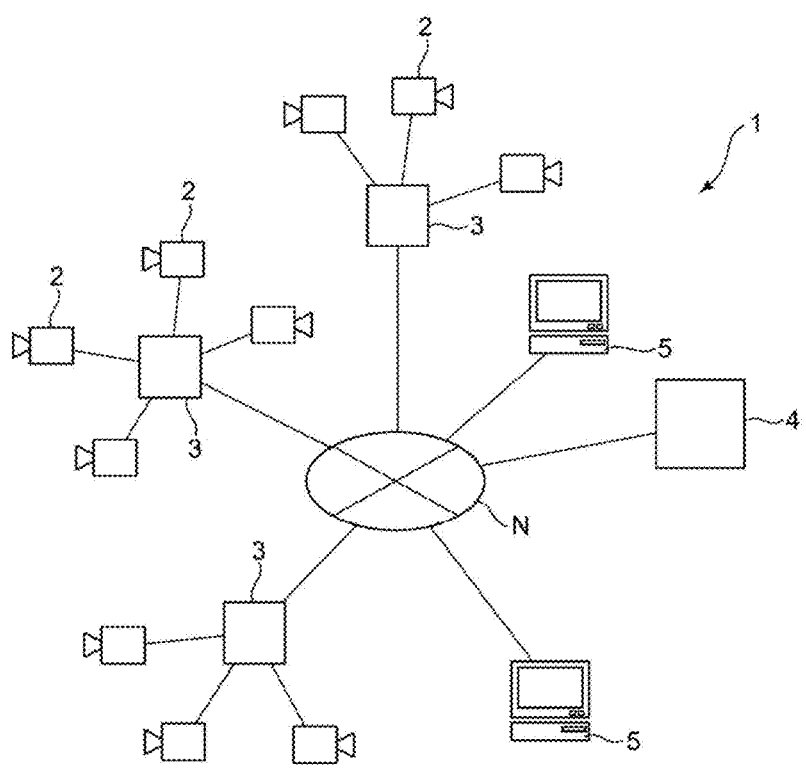
FIG. 1 shows a schematic structure of a camera system in Embodiment 1 according to the present invention.

1: Camera system
2: Camera
3: Base server
4: Cloud server
10: Storage unit
11: Reference image-transmitting unit
12: Extraction area-calculating unit
13: Extraction image-transmitting unit
20: Image-composing unit
21: Image data-storing unit
22: Moving image-providing unit
23: Camera installation information-storing unit
24: Area information-storing unit
26: Camera base position information-providing unit
27: Thumbnail image-providing unit
28: Weather information-acquiring unit
29: Camera-specifying unit
30: Weather information-providing unit

DETAILED DESCRIPTION OF THE PREFERRED EMBODIMENTS

Figure 2:
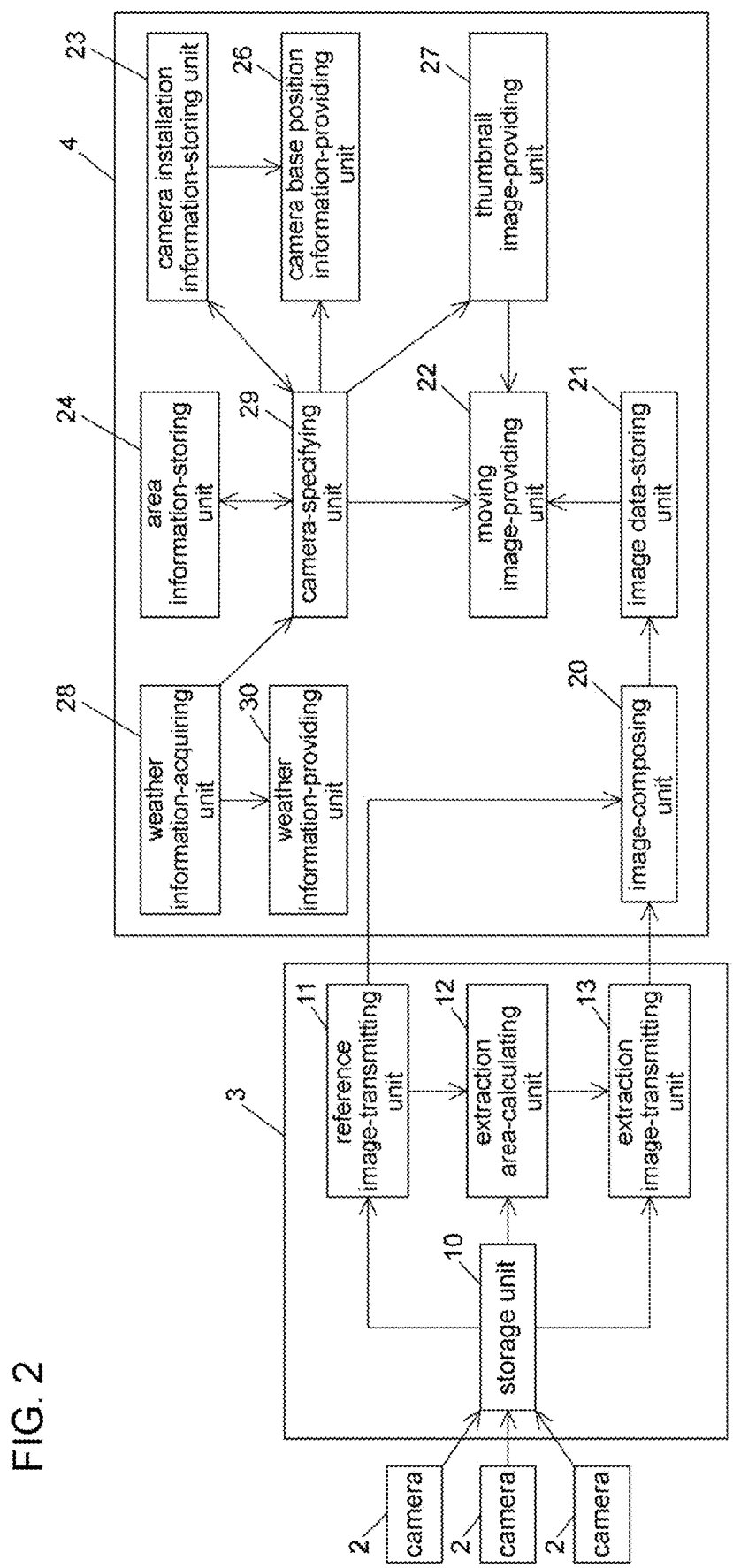
FIG. 2 is a block diagram of the camera system in FIG. 1.

FIG. 1 shows a schematic structure of a camera system in Embodiment 1 according to the present invention, and FIG. 2 is a block diagram of the camera system in FIG. 1.

As shown in FIG. 1, a camera system 1 in Embodiment 1 according to the present invention includes the following elements:

a plurality of cameras 2 being installed within a plurality of bases, respectively;

a base server 3 being installed within the respective base, and the plurality of cameras 2 being connected to the base server 3, respectively; and a cloud server 4 being connected to the base server 3 via an electric telecommunication line N.

The plurality of cameras 2 are imaging devices photographing still images at predetermined time intervals (for example, time intervals of 1/120 through 1 [sec]) to obtain continuous frame images.

The number of the plurality of cameras 2 installed within each base may be one, two, or more.

As shown in FIG. 2, the base server 3 includes the following elements:

a storage unit 10 temporarily storing the respective frame images of the continuous frame images obtained in sequence by the plurality of cameras 2;

a reference image-transmitting unit 11 transmitting data (hereinafter, called as "reference image data") of a frame (hereinafter, called as "reference frame") to be regarded as reference to the cloud server 4 according to predetermined timing;

an extraction area-calculating unit 12 calculating an area (hereinafter, called as "extraction area") to be extracted from the respective frames after the reference frame with respect to a plurality of frames; and an extraction area-transmitting unit 13 extracting in sequence image data within the extraction area from images of the respective frames to transmit the extraction image data to the cloud server 4.

The reference image-transmitting unit 11 transmits image data (reference image data) of a frame (reference frame) to be regarded as reference according to predetermined timing to the cloud server from images of the continuous frames obtained in sequence by the plurality of cameras 2.

The reference frame may be determined according to predetermined timing (for example, at time intervals of 30 [sec], 1 [min], the predetermined number of frames, or the like.)

The extraction area-calculating unit 12 performs:

obtaining an image (hereinafter, called as "background image") to be regarded as background from images of the continuous frames obtained in sequence by the plurality of cameras 2; and with respect to the respective frames of the continuous frames obtained in sequence by the plurality of cameras 2, the respective frames being after the reference frame, calculating a third area surrounding both a first area and a second area, the first area surrounding an area wherein there is a difference between the respective frame image and the background image, the second area surrounding an area wherein there is a difference between an immediately before frame image of the respective frame image and the background image.

The third area is an area (extraction area) that the extraction area-transmitting unit 13 extracts and transmits thereof.

As the background image, an average of frame images immediately before the respective frame may be used.

For example, upon calculating with respect to a frame an area wherein there is a difference between the frame image and the background image, the extraction area-calculating unit 12 may use an average of 100 frame images immediately before the frame as the background image to take a difference between the background image and the frame image.

The extraction area-calculating unit 12 performs such difference process on the respective frames after the reference frame to calculate the third area surrounding both the first area and the second area. The first area surrounds an area wherein there is a difference between the respective frame image and the background image. The second area surrounds an area wherein there is a difference between an immediately before frame image of the respective frame image and the background image.

The extraction area-transmitting unit 13 extracts in sequence image data of the third area from the respective frame images to transmit the image data to the cloud server, the image data of the third area being calculated by the extraction area-calculating unit 12.

In addition to the image data of the third area, the extraction area-transmitting unit 13 transmits an extraction area (coordinates (X, Y), width W, and height H thereof) to the cloud server 4.

The base server 3 is realized by running one or more programs on a computer so as to make the computer to function as the above units 11-13. The computer may be a general-purpose server, a personal computer, a microcomputer, a PDA (personal information terminal), a pocket computer, a smart phone, and a feature phone (portable telephone), or the like.

On the other hand, the cloud server 4 includes the following elements:

an image-compositing unit 20 entering the reference image data transmitted from the base server 3 and the image data of the third area with respect to the respective frame to compose moving images;

an image data-storing unit 21 storing the moving images composed by the image-compositing unit 20; and a moving image-providing unit 22 providing the moving image stored by the image data-storing unit 21 to a computer 5 (See, FIG. 1) connected thereto via a electric telecommunication line N.

The computer 5 may be a computer capable of being connected to the cloud computer 4 via electric telecommunication lines N. The computer 5 may be a personal computer, a microcomputer, a PDA (personal information terminal), a pocket computer, a smart phone, a feature phone (portable telephone), a handheld game machine, or the like.

The image-compositing unit 20 composes moving images from the reference image data transmitted from the base server 3 and the image date of the third area of the respective frames to store the composed moving images onto the image data-storing unit 21.

In this Embodiment, the image-compositing unit 20 composes the moving images by replacing a part of the reference image data based on extraction area information of the respective frames with the image data of the third area of the respective frames.

For example, regarding the reference frame image, based on extraction area information of the next frame, the image-compositing unit 20 replaces a part whose coordinates are (X, Y), whose width is W, and whose height is H of image data with image data of the third area of the same frame to make the replaced image data to be image data for the next frame of the reference frame.

Regarding the further next frame, the image-compositing unit 20 composes moving images by replacing in sequence, based on extraction area information, replaces image data of an immediately before frame with image data of the third area.

The composed moving images are stored onto the image data-storing unit 21 as moving images generated from still images photographed by the respective plurality of cameras 2.

In addition, thumbnail images of the images photographed by the respective camera 2 are also pre-generated and stored onto the same image data-storing unit 21.

The moving image-providing unit 22 provides the moving images stored onto the image data-storing unit 21 in response to a request from the computer 5 connected via the electric telecommunication lines N.

When the computer 5 requests moving images while specifying the plurality of cameras 2 within a base of interest, the moving image-providing unit 22 obtains the requested moving images from the image data-storing unit 21, and provides thereof to the computer 5 via the electric telecommunication lines N.

Processes of specifying the camera 2 within the base of interest, and requesting moving images will be mentioned later.

In addition, the cloud server 4 includes the following elements:

a camera installation information-storing unit 23 storing information with respect to the positions of the respective bases wherein the plurality of cameras 2 are installed;

an area information-storing unit 24 storing area information for classifying areas of the respective bases wherein the plurality of cameras 2 are installed;

a camera base position-providing unit 26 providing an image that the respective bases wherein the plurality of cameras are installed is displayed on a map; and a thumbnail image-providing unit 27 providing thumbnail images corresponding to the respective plurality of cameras 2.

The information with respect to the positions of the respective bases, the information being stored by the camera installation information-storing unit 23, includes items for specifying names, longitude and latitude, addresses, or the like of the bases, respectively.

The local information memorized by the area information-storing unit 24 is information which shows the names (cities, wards, towns, villages, and so on) in a unit of municipality for classifying each base for every area, and the range of those (a set of the longitude and latitude, and so on).

The camera base position-providing unit 26 provides to the computer 5 an image in which the respective bases wherein the plurality of cameras 2 are installed are displayed on a map according to the information with respect to the respective bases wherein the plurality of cameras 2 are installed, the information being stored by the camera installation information-storing unit 23.

Figure 3:
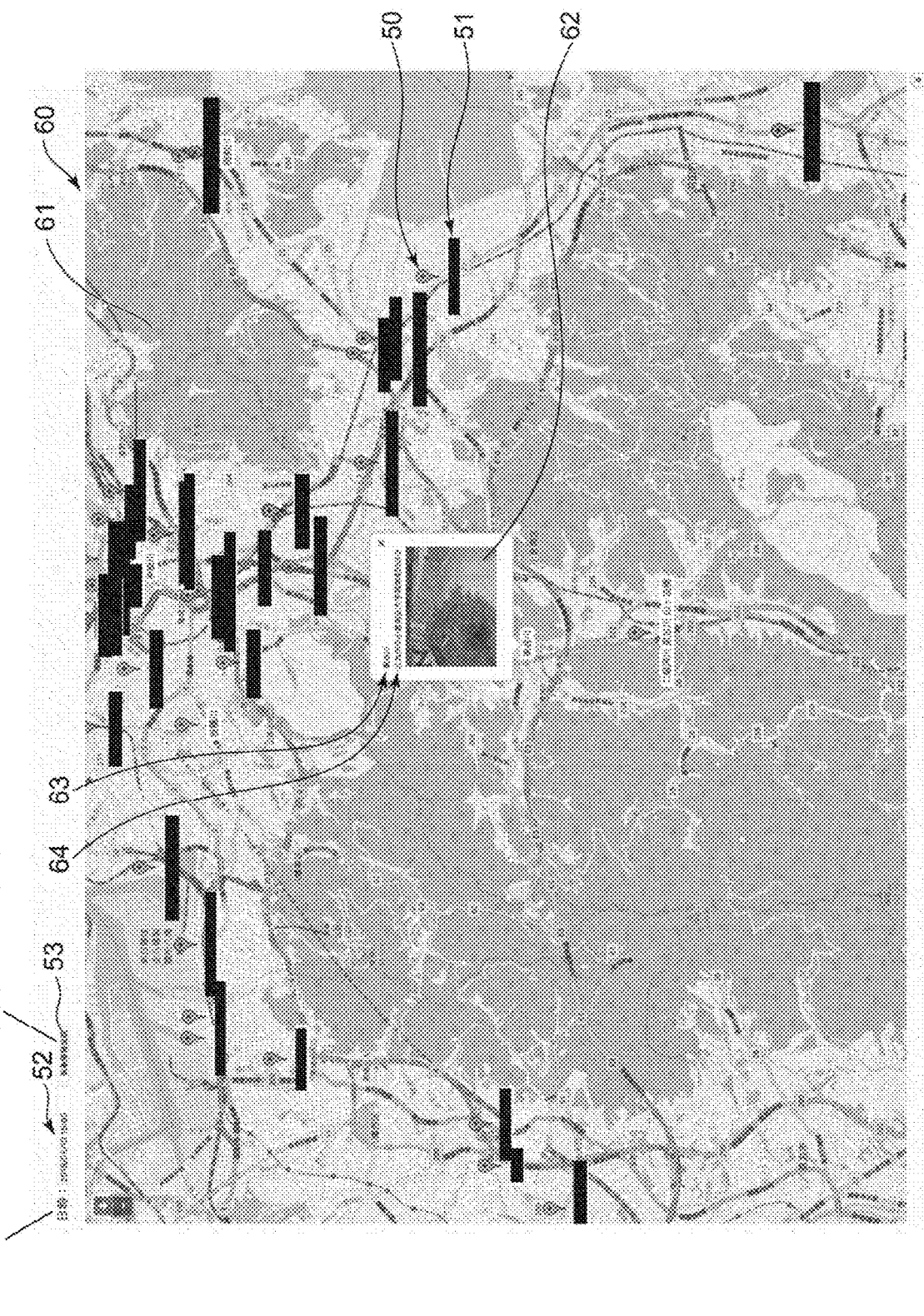
FIG. 3 shows an example of an image wherein a number of bases with a plurality of cameras installed therein are displayed on a map.

FIG. 3 shows an example of an image wherein the bases in which the plurality of cameras 2 are installed are displayed.

As shown in FIG. 3, on this image, icons 50 indicating: positions of the bases wherein the plurality of cameras 2 are installed; and names of the bases are displayed on the map 61, respectively.

Herein, when the computer 5 issues zoom in instructions for decreasing the scale of the area to be a predetermined small range, the camera base position information-providing unit 26 makes the map to zoom in and/or to zoom out in accordance with the issued instructions. Furthermore, the camera base position information-providing unit 26 provides to the computer 5 the image 60 wherein icons 50 and names 51 of the bases belonging to the small area are displayed respectively on the map 61.

The thumbnail image-providing unit 27 obtains from the image data-storing unit 21 thumbnail images corresponding to the plurality of cameras 2 installed within the selected base among the bases whose the icon 50 and the name 51 are displayed on the map, and provides the computer 5 with an image wherein a list of the obtained thumbnail images are displayed thereon, the selection being caused by clicking or the like the icon 50 and/or the name 51 on the map.

As shown in FIG. 3, the thumbnail image-providing unit 27 displays the thumbnail image 62 corresponding to the camera 2 installed within the selected base.

When a plurality of cameras 2 are installed within the selected base, the thumbnail image-providing unit 27 displays a plurality of thumbnail images respectively corresponding to the plurality of cameras 2.

As shown in FIG. 3, the thumbnail image-providing unit 27 also displays the name 63 and the address 64 of the selected base.

The above-mentioned moving image-providing unit 22 obtains from the image data-storing unit 21 and provides moving images corresponding to the selected camera among the plurality of cameras whose thumbnail images are displayed in a manner of a list.

As shown in FIG. 3, when a displayed thumbnail image is selected by a click or the like, the moving image-providing unit 22 acquires from the image data-storing unit 21 moving images corresponding to the camera selected by means of the selected thumbnail image to provide the computer 5 with the same.

Herein, if a plurality of thumbnail images are displayed, the moving image-providing unit 22 provides moving images of a camera corresponding to a thumbnail image selected by means of a click or the like among the plurality of displayed thumbnail images.

Figure 4:
FIG. 4 shows an example of a screen displaying moving images.

FIG. 4 shows an example of a display screen showing moving images when the thumbnail image 62 shown in FIG. 3 is selected.

As shown in FIG. 4, the moving images 70 corresponding to the selected camera by means of the thumbnail image 62 are displayed on this display screen showing the moving images.

In addition, the moving image-providing unit 22 can acquire from the image data-storing unit 21 not only live moving images but also past moving images corresponding to the selected camera by designating date and time of the past moving images corresponding to the selected camera to provide the computer 5 with the acquired past moving images.

In addition, the cloud server 4 includes the following elements:

a weather information-acquiring unit 28 acquiring weather information provided with respect to weather, the weather information including information relating to an area of interest;

a camera-specifying unit 29 using the weather information acquired by the weather information-acquiring unit 28 to specify a camera installed within the area of interest; and a weather information-providing unit 30 providing an image wherein the weather information acquired by the weather information-acquiring unit 18 is superposably displayed on the area of interest on a map.

In this specification, the "weather information" is emergency warning information ("Tokubetsu-Keihou" in Japanese), warning information ("Keihou" in Japanese), caution information ("Chuihou" in Japanese), or the like with respect to the weather, such as a storm, a snowstorm, heavy rain, heavy snow, thunder, dryness, thick fog, frost, snowslide, cold temperature, snow accretion, ice accretion, melting of snow, landslide, landslip, high tide, ocean waves, inundation, flood, or the like. And, the "weather information" further includes information with respect to of an area of interest. Herein in this specification, the warning information indicates a more serious state than the caution information, and the emergency warning information indicates a more serious state than the warning information.

The weather information is provided at any time from weather information-providing organization, such as the Meteorological Agency, and the weather information-acquiring unit 28 acquires the weather information provided by the weather information-providing organization periodically and/or at any time.

Based on the weather information acquired by the weather information-acquiring unit 28, the camera-specifying unit 29 specifies one or more cameras 2 installed within the area of interest while using information with respect to the positions of the respective bases stored by the camera installation information-storing unit 23.

For example, when the weather information indicates that storm warning regarding a certain district "X" has been issued, one or more cameras 2 installed within the certain district "X" are specified.

When the one or more cameras 2 are specified by the camera-specifying unit 29, the above-mentioned moving image-providing unit 22 acquires from the image data-storing unit 21 moving images of the specified plurality of cameras 2 to provide the computer 5 with the acquired moving images.

In addition, if there are a plurality of cameras 2 installed within the specified area of interest, the thumbnail image-providing unit 27 may acquire from the image data-storing unit 21 thumbnail images corresponding to the plurality of cameras 2 installed within the specified area of interest to provide an image wherein the acquired thumbnail images are displayed in a manner of a list.

And then, the moving image-providing unit 22 may acquire from the image data-storing unit 21 the moving images corresponding to a certain camera selected among the plurality of cameras whose thumbnail images are displayed in the manner of the list by the thumbnail image-providing unit 27 to provide the computer 5 with the moving images corresponding to the selected certain camera. Such a configuration can be considered, alternatively.

Based on the weather information acquired by the weather information-acquiring unit 28, the weather information-providing unit 30 provides an image wherein the weather information is superposably displayed on the area of interest on a map.

Figure 5:
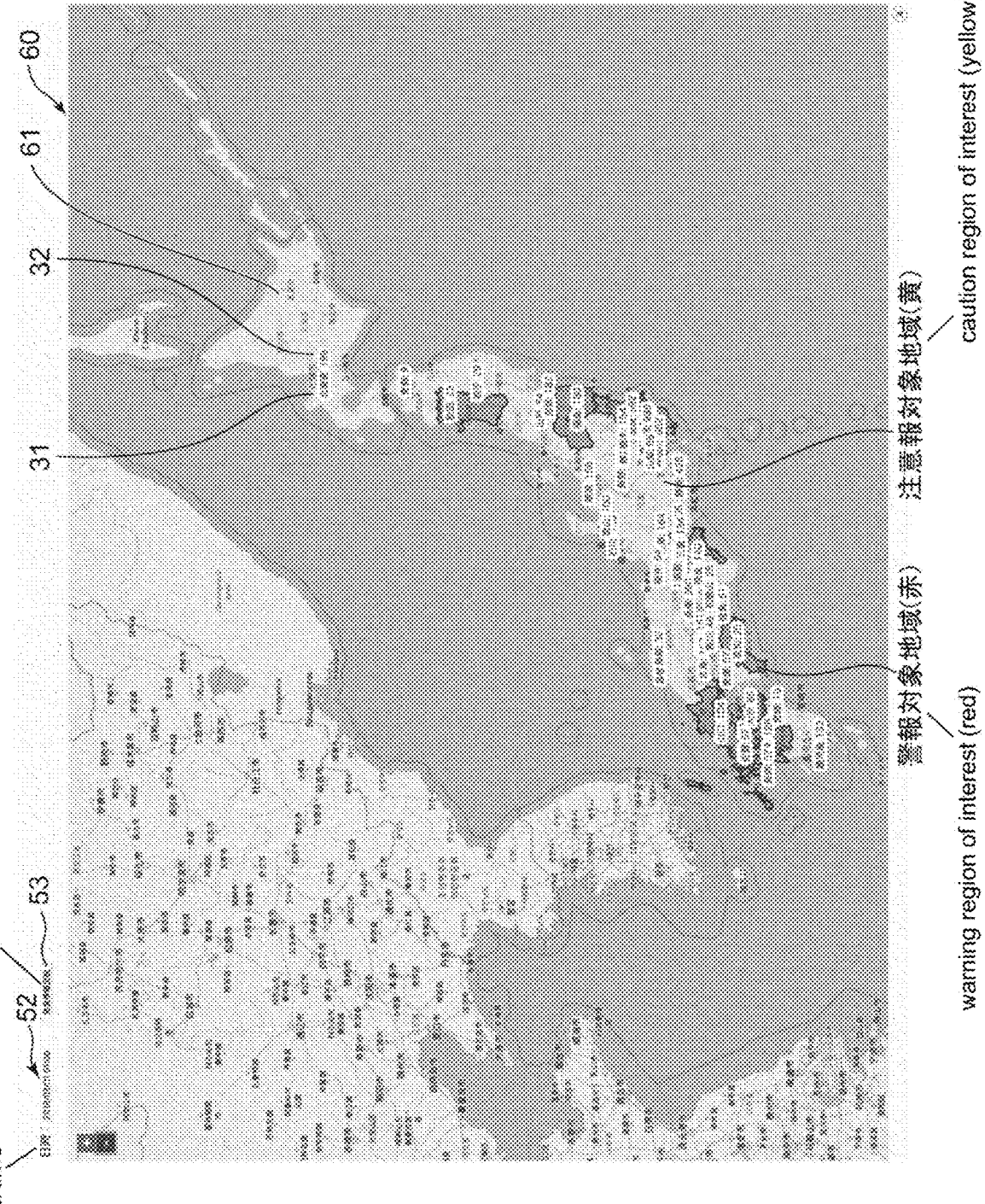
FIG. 5 shows an example of an image wherein weather information regarding an area of interest is superposably displayed on a map.

FIG. 5 shows an example of an image wherein weather information regarding an area of interest is superposably displayed on a map.

In the example shown in FIG. 5, areas of interest wherein emergency warning information, warning information, and/or caution information have/has been issued as the weather information are colored (a most serious color of "purple" for the emergency warning information, a more serious color of "red" for the warning information, and a serious color of "yellow" for the caution information) to produce an image 60, and the image 60 is superposably displayed on the map 61.

In addition, based on the information with respect to the positions of bases wherein the plurality of cameras 2 are installed, the information being stored by the camera installation information-storing unit 23, the camera base position information-providing unit 26 totals a number of bases wherein the plurality of cameras are installed for every area. And then, in the image shown in FIG. 5, the names 31 and the totaled numbers 32 of bases for every area are displayed on the map.

Herein, when the computer 5 issues instructions of zoom in and/or zoom out, the base number-providing unit 26 makes the map 61 to zoom in and/or to zoom out in accordance with the instructions. Furthermore, the base number-providing unit 26 increases/decreases the scale of area classification for totaling the numbers, re-totals a number of bases for every new area, and displays the re-totaled number on the map 61 to provide the image 60 showing the same thereon.

At this time as the same as mentioned above, the weather information-providing unit 30 colors areas of interest wherein emergency warning information, warning information, and/or caution information have/has been issued as the weather information to produce a colored image, thereby superposably displaying the colored image onto the map 61.

Figure 6:
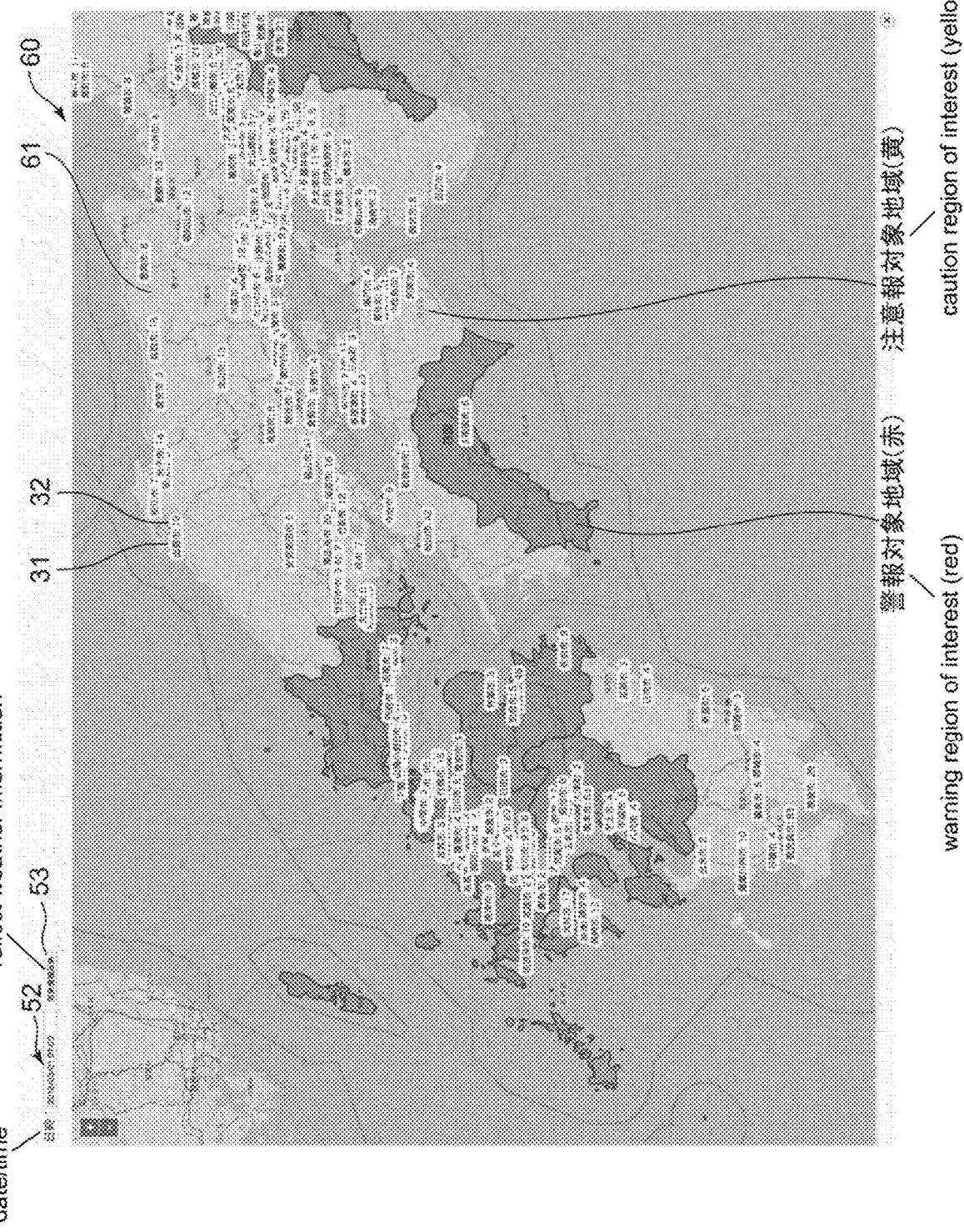
FIG. 6 shows a first state zoomed in from a state shown in FIG. 5.

FIG. 6 shows an example of an image wherein the number of bases is totaled in a unit of municipality, and the totaled numbers are displayed on the map which has been zoomed in from the state shown in FIG. 5.

Figure 7:
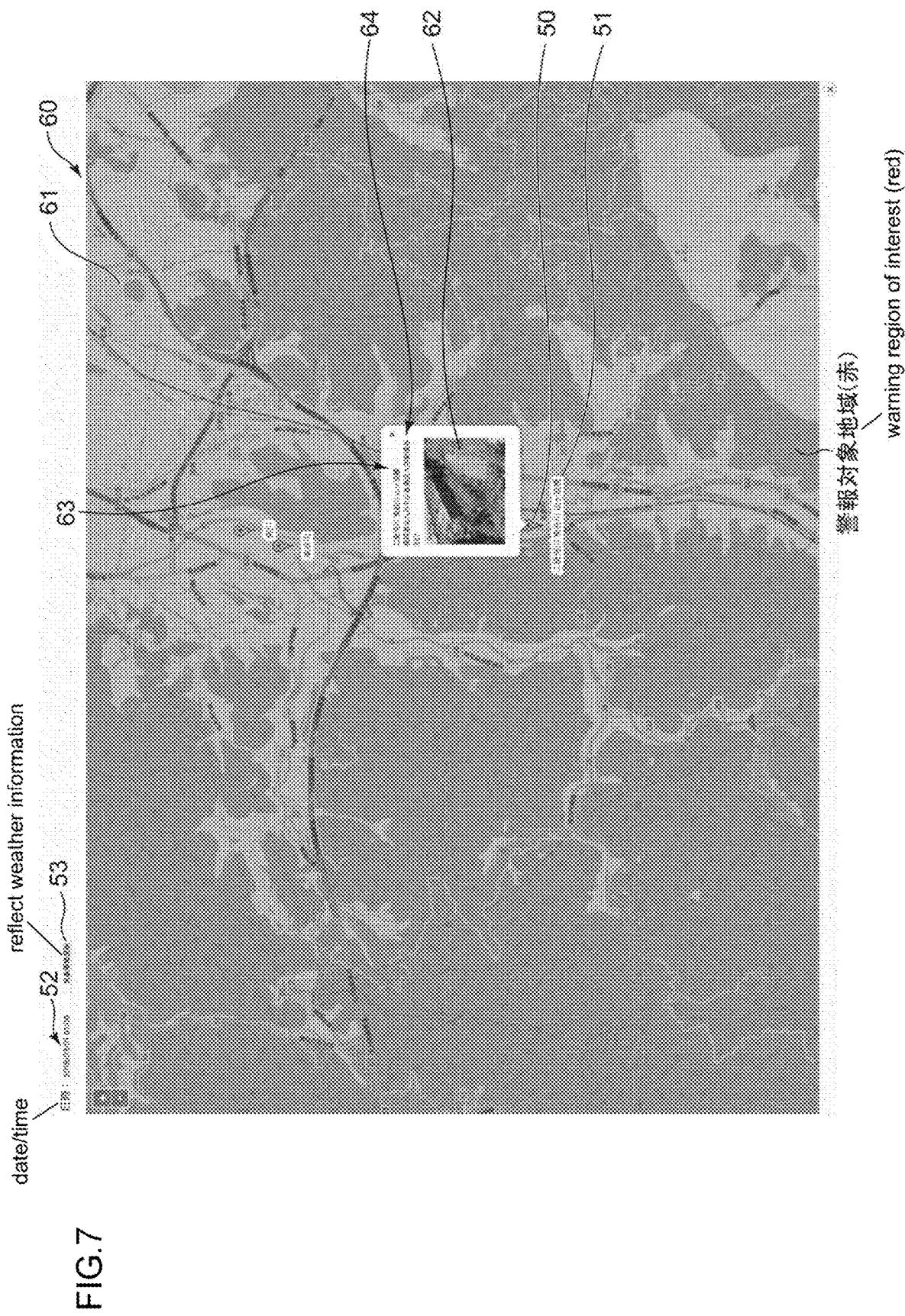
FIG. 7 shows a second state further zoomed in from the state shown in FIG. 6.

FIG. 7 shows an example, wherein:

in a state further having been zoomed in from the state of FIG. 6, an icon 50 and/or a name 51 of a base wherein the plurality of cameras 2 are installed are/is selected; and the thumbnail image 62, the name 63, and the address 64 of the selected base corresponding to the plurality of cameras 2 installed within the selected base are displayed.

Figure 8:
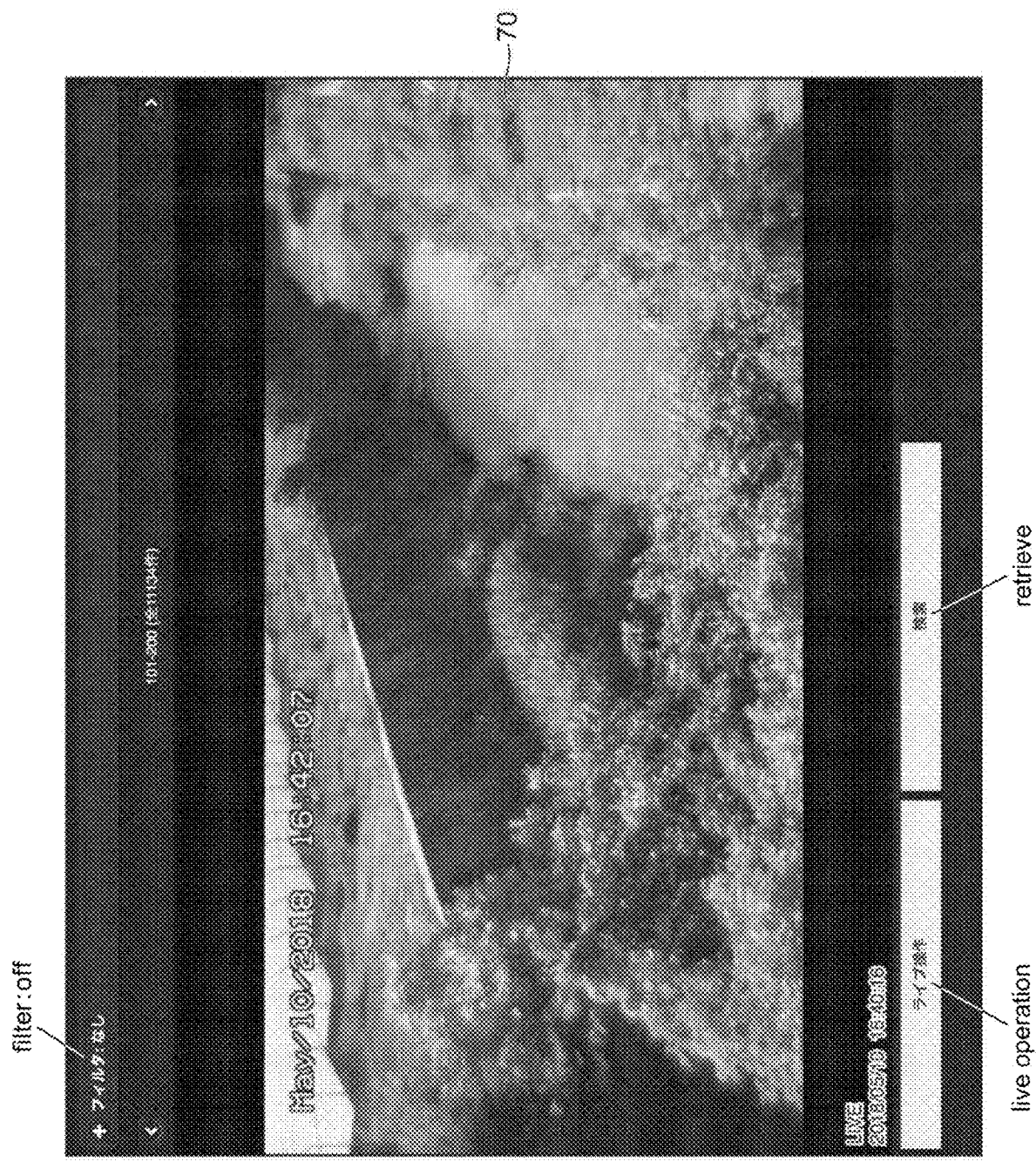
FIG. 8 shows an example of a screen displaying moving images when a thumbnail image shown in FIG. 7 is selected.

FIG. 8 shows an example of a screen displaying moving images when a thumbnail image 62 shown in FIG. 7 is selected The cloud server 4 according to the above-mentioned structure is realized by running one or more programs on a server built under cloud environment for making the server to function as the above units, respectively.

The camera system 1 with the above-mentioned structure provides the following benefits. As shown in FIG. 3, when a base among the respective bases wherein the plurality of cameras 2 are installed is selected on the image wherein the respective bases are displayed thereon, a list of thumbnail images corresponding to the plurality of cameras 2 installed within the selected base is displayed. And, when one camera 2 among the plurality of cameras 2 whose thumbnail images are displayed in a manner of the list is selected, moving images corresponding to the selected camera 2 are provided to the computer 5. In this way, it is possible to easily specify a specific camera 2 among the plurality of cameras 2 installed with in the respective bases so as to confirm moving images related to the selected camera 2.

In addition, according to this camera system 1, when the weather information-acquiring unit 28 acquires weather information, the camera-specifying unit 29 specifies cameras 2 installed within an area of interest based on the acquired weather information, and the moving image-providing unit 22 provides the computer 5 with moving images of the specified plurality of cameras 2.

For this reason, when emergency warning information, warning information, and/or caution information have/has been issued, it is possible to easily specify a specific camera 2 among the plurality of cameras 2 installed within the area of interest indicated by the weather information so as to confirm moving images 70 related to the specified camera 2.

According to the camera system 1 in this Embodiment, specifying past time by means of the date and time-designating column 52 shown in FIGS. 3 and 5 through 7, and selecting the weather information reflection button 53 enables to cause the past weather information at the specified date and time to reflect on the map 61.

Figure 9:
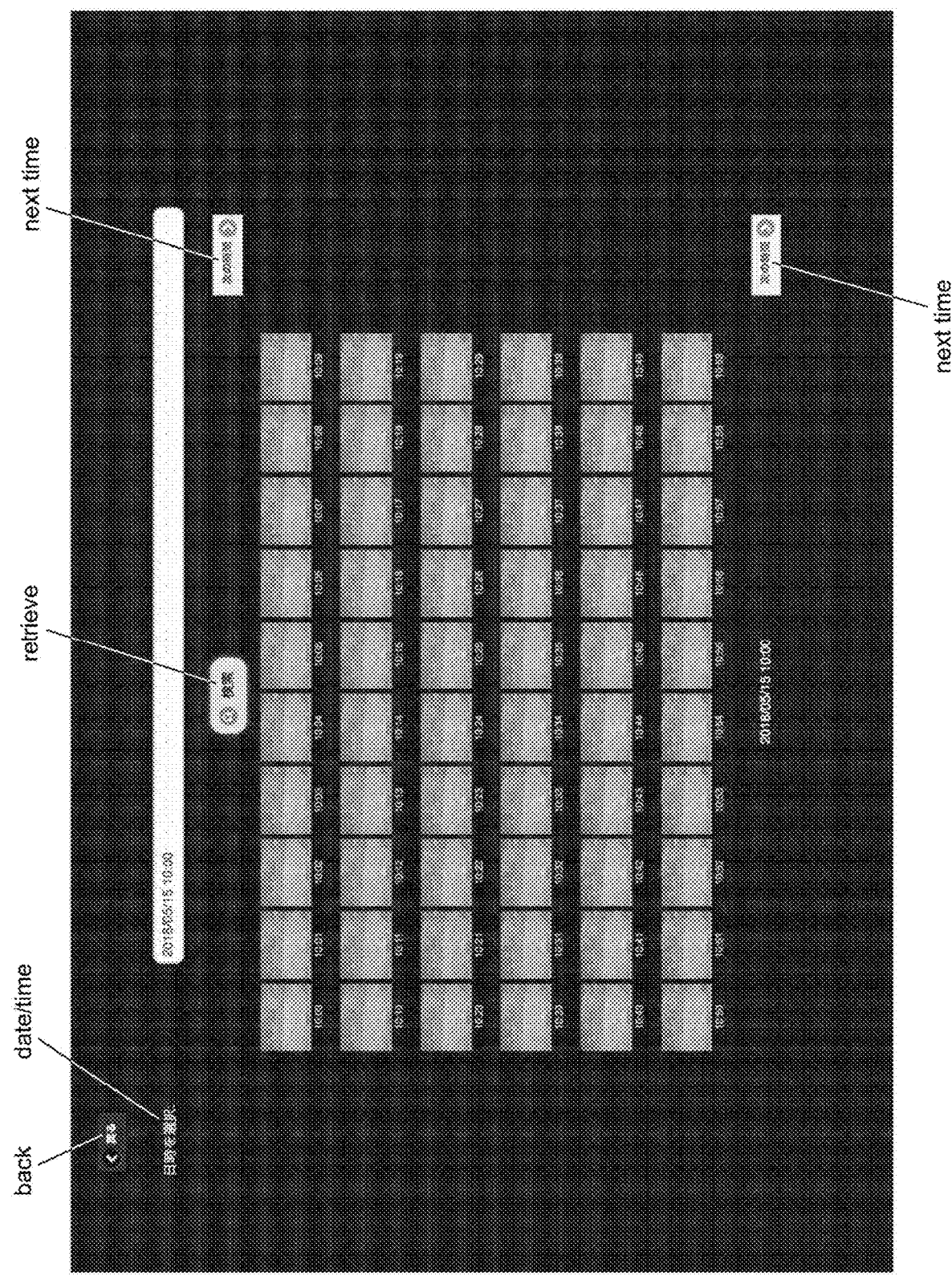
FIG. 9 shows an example of a screen when browsing past images.

And in this state, when the thumbnail image 62 is selected, a past image-browsing screen as shown in FIG. 9 is displayed. Furthermore, when past time and date is selected on the past image-browsing screen, the past moving images 70 at the selected past and date will now be displayed.

In addition, according to this camera system 1, since the image 60 wherein the respective bases in which the plurality of cameras 2 are installed are displayed on the map 61 is provided to the computer 5 by the camera base position information-providing unit 26, it is possible to easily, on the map 61, confirm the respective bases whose moving images are provided as mentioned above in accordance with the weather information.

Furthermore, according to this camera system 1, the image 60 is provided to the computer 5 by the weather information-providing unit 30. As shown in FIGS. 5 through 7, in the image 60, the weather information is superposably displayed on the area of interest on the map 61 based on the weather information acquired by the weather information-acquiring unit 28. Not only moving images 70 of the plurality of cameras 2 installed within the area of interest are provided, but also it is possible to easily confirm the weather information within the area of interest on the map 61.

Figure 10:
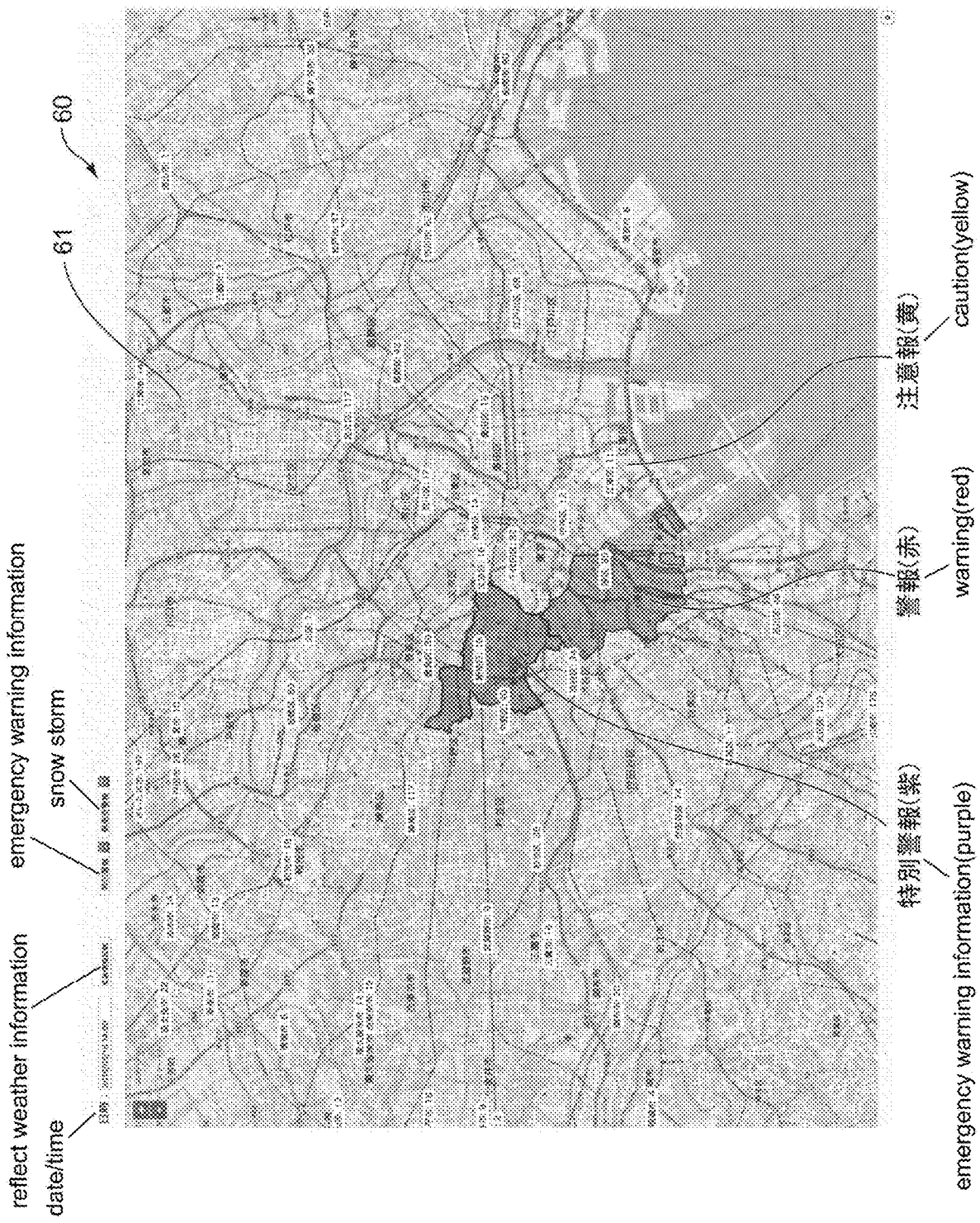
FIG. 10 shows an example wherein weather information is superposably displayed on a map in a municipal unit.

In the example shown in FIGS. 5 through 7, the weather information in a unit of prefecture is displayed on the map 61. However, as shown in FIG. 10, the weather information in a unit of municipality can be also displayed on the map 61. Such a configuration can be considered, alternatively.

In addition, in this camera system 1, when weather information is going to be superposably displayed on the map 61, it is possible to display only items regarding selected emergency warning information, warning information, caution information, or the like by means of a warning class selection column 54 and/or a detailed selection column 55 as shown in FIG. 11.

For example, on the warning class selection column 54, emergency warning information, warning information, or caution information can be selected by means of a pull-down menu thereon.

When the emergency warning information is selected on the warning class selection column 54, on the detailed selection column 55, snowstorm emergency warning information, heavy rain emergency warning information, storm emergency warning information, heavy snow emergency warning information, ocean wave emergency warning information, high tide emergency warning information, or the like can be selected by means of a pull-down menu thereon.

When the warning information is selected on the warning class selection column 54, on the detailed selection column 55, snowstorm warning information, heavy rain warning information, storm warning information, heavy snow warning information, ocean wave warning information, high tide warning information, or the like can be selected by means of a pull-down menu thereon.

When the caution information is selected on the warning class selection column 54, on the detailed selection column 55, heavy rain caution information, heavy snow caution information, snowstorm caution information, thunder caution information, storm caution information, ocean wave caution information, melting of snow caution information, flood caution information, high tide caution information, thick fog caution information, dryness caution information, snowslide caution information, cold temperature caution information, frost caution information, ice accretion caution information, snow accretion caution information, or the like can be selected by means of a pull-down menu thereon.

As mentioned above, when the weather information is selected, only the selected weather information is displayed on the map 61.

Figure 12:
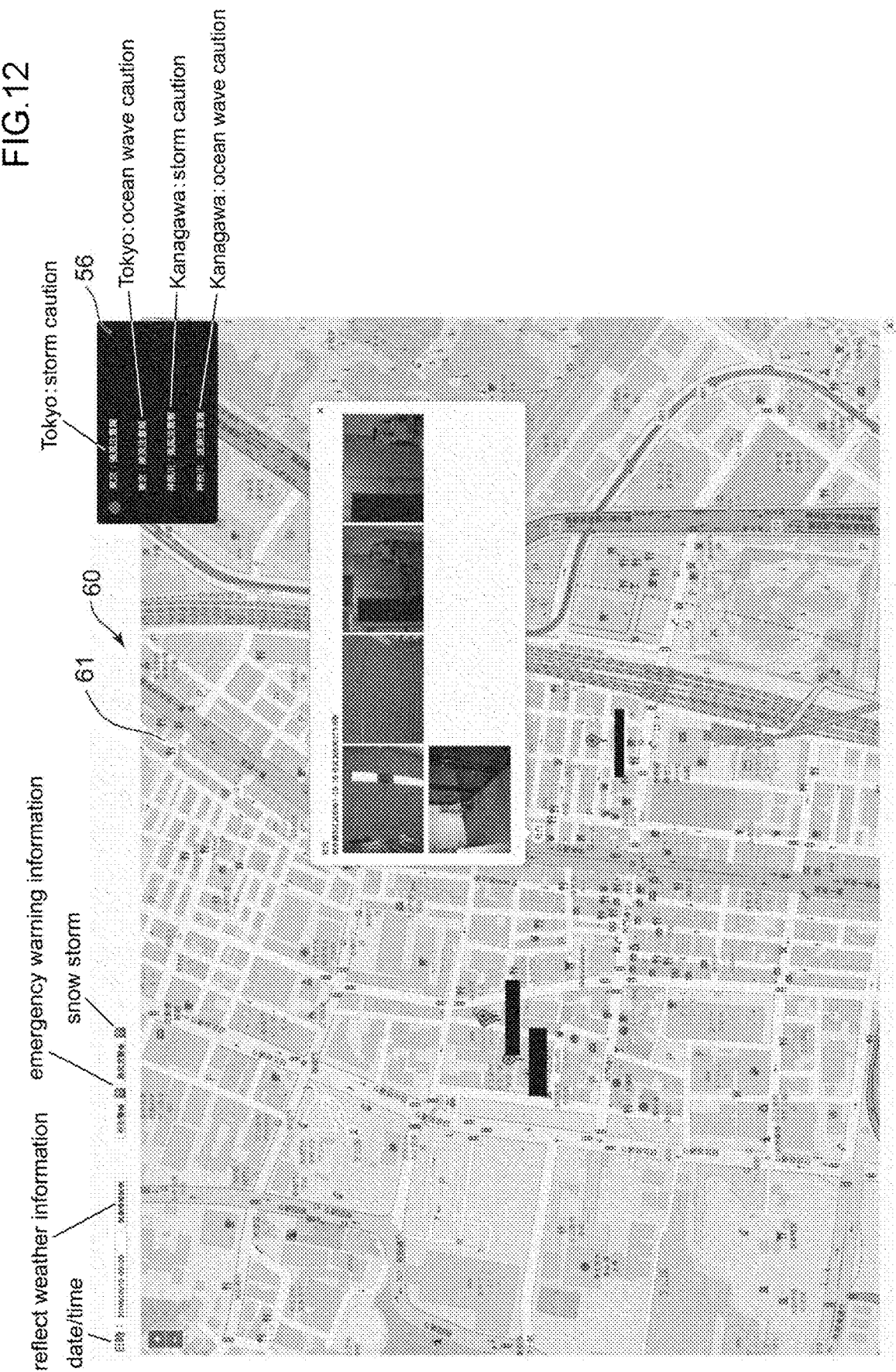
FIG. 12 shows an example wherein weather information is displayed with characters.

In this Embodiment, the example wherein the emergency warning information, the warning information, and the caution information, each of which has been issued as the weather information, are superposably displayed so as to have different colors with each other has been explained. However, as shown in FIG. 12, the issued whether information 56 may be displayed with characters, and furthermore detailed information of the weather information may be superposably displayed with characters, images, or the like. Such a configuration can be considered, alternatively.

In this camera system 1, when there are a plurality of cameras are installed within a specified area of interest, the thumbnail image-providing unit 27 displays thumbnail images corresponding to the plurality of cameras 2 installed within the specified area of interest in a manner of a list. And furthermore, when a camera 2 among the plurality of cameras 2 whose thumbnail images are displayed in the manner of the list, moving images corresponding to the selected camera 2 will now be provided.

In this way, it becomes possible to easily specify in accordance with the weather information the camera 2 among cameras 2 installed within the area of interest and to confirm the moving images related to the selected camera as ease.

Regarding the computer 5, it is possible to set up an accessible range with respect to the image data-storing unit 21 and the camera installation information-storing unit 23 by means of certification of users.

This structure enables to limit, for each user, information provided by the base number-providing unit 25, the camera base position-providing unit 26, the thumbnail image-providing unit 27, and the moving image-providing unit 22 so that every user is provided with only information that the user can access by himself/herself.

INDUSTRIAL APPLICABILITY

The camera system according to the present invention is useful as a camera system displaying images of a lot of cameras installed within a plurality of bases. This system is preferable as a camera system capable of easily specifying a camera among a lot of cameras respectively installed within the bases so as to confirm images related to the same, in accordance with weather information particularly.

What is claimed is:
1. A camera system, comprising:
a weather information-acquiring unit, which includes one or more computers, acquiring weather information provided with respect to weather, the weather information including information relating to an area of interest;
a plurality of cameras installed within a plurality of bases, respectively;
a camera installation information-storing unit, which includes one or more storages, storing information with respect to positions of the bases wherein the plurality of cameras are installed;
an image data-storing unit, which includes one or more storages, storing images photographed by the plurality of cameras respectively as moving images;
a camera-specifying unit, which includes one or more computers, using the weather information acquired by the weather information-acquiring unit to specify a camera installed within the area of interest based on the information with respect to the positions of the bases, the information with respect to the positions of the bases being stored in the camera installation information-storing unit;
a weather information-providing unit, which includes one or more computers, providing an image wherein, based on the weather information acquired by the weather information-acquiring unit, the weather information is superposably displayed on the area of interest on a map;
a moving image-providing unit, which includes one or more computers, acquiring from the image data-storing unit not only live moving images but also past moving images corresponding to the camera specified by the camera-specifying unit to provide the acquired moving images;

a camera base position information-providing unit, which includes one or more computers, providing an image in which the bases wherein the plurality of cameras are installed are displayed on a map;

a screen configured to display the live moving images and the past moving images; and an information reflection button that causes the screen to display the past moving images at a specified date and time to reflect on the map.

2. The camera system as defined in claim 1, wherein the image data-storing unit further stores the images photographed by the plurality of cameras respectively as well as thumbnail images, and wherein the camera system further comprises a thumbnail image-providing unit, which includes one or more computers, acquiring from the image data-storing unit a thumbnail image of the camera specified by the camera-specifying unit to provide an image wherein the acquired thumbnail image is displayed as a list, and wherein the moving image-providing unit acquires moving images corresponding to a camera selected from a plurality of cameras whose thumbnail images are displayed as the list to provide the acquired moving images.

3. The camera system as defined in claim 1, wherein the moving images stored by the image data-storing unit are moving images generated from still images photographed by the plurality of cameras, respectively.

* * * * *